United States Patent
Lin (10) Patent No.: US 7,080,594 B2
(45) Date of Patent: Jul. 25, 2006

(54) FOOD AND VEGETABLE PROCESSING DEVICE

(75) Inventor: Wei-Chih Lin, No. 27, Huairen St., Banchiao City, Taipei (TW)

(73) Assignees: Ping-Huang Wu, Taipei (TW); Wei-Chih Lin, Taipei (TW)

( * ) Notice: Subject to any disclaimer, the term of this patent is extended or adjusted under 35 U.S.C. 154(b) by 38 days.

(21) Appl. No.: 10/829,357

(22) Filed: Apr. 22, 2004

(65) Prior Publication Data

US 2005/0235839 A1    Oct. 27, 2005

(51) Int. Cl.
  *A23N 1/00* (2006.01)
(52) U.S. Cl. .......................................... 99/511; 99/513
(58) Field of Classification Search .................. 99/348, 99/492, 509–513, 485, 495; 366/205, 206, 366/96–98, 197, 199, 314, 342, 315, 343; 241/282.1, 282.2, 282.5, 292.1, 199.12, 37.5, 241/92, 285.1, 285.2; 426/519, 518; 403/206, 403/300
See application file for complete search history.

(56) References Cited

U.S. PATENT DOCUMENTS

| | | | | | |
|---|---|---|---|---|---|
| 2,527,695 | A | * | 10/1950 | Bennett | 99/511 |
| 2,840,130 | A | * | 6/1958 | Schwarz | 99/511 |
| 5,031,522 | A | * | 7/1991 | Brixel et al. | 99/511 |
| 6,543,340 | B1 | * | 4/2003 | Fouquet | 99/511 |
| 6,813,997 | B1 | * | 11/2004 | Lin | 99/511 |
| 6,862,982 | B1 | * | 3/2005 | Wang | 99/511 |

* cited by examiner

*Primary Examiner*—Timothy F. Simone
(74) *Attorney, Agent, or Firm*—Lowe Hauptman & Berner, LLP (57) ABSTRACT

A food and vegetable processing device includes a body with a motor so as to drive a processing unit which is attached by a lower cap with an outlet. A top cap is mounted to the lower cap and includes a feeding passage for feeding food and vegetable to the processing unit. The processing unit includes a blade disk, which has a convex top surface thereon cutting teeth are located. The convex top surface drives the food and vegetable to be processed move outward so as to obtain a satisfied result.

9 Claims, 13 Drawing Sheets

FOOD AND VEGETABLE PROCESSING DEVICE

FIELD OF THE INVENTION

The present invention relates to a food and vegetable processing device having a blade disk with a convex surface which moves the food and vegetable outward to be processed.

BACKGROUND OF THE INVENTION

Figure 12:
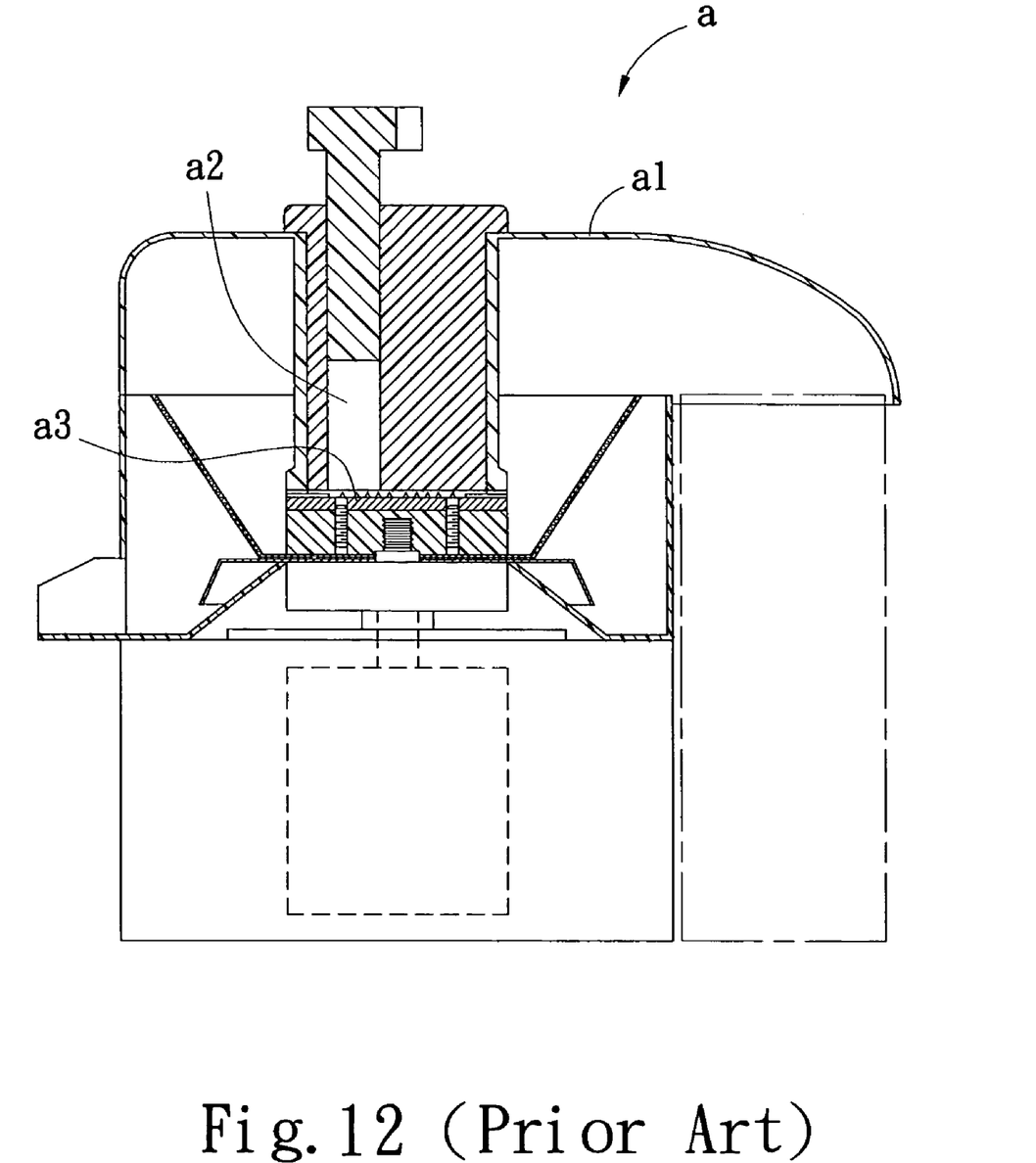
FIG. 12 shows a first conventional food and vegetable processing device.
Figure 13:
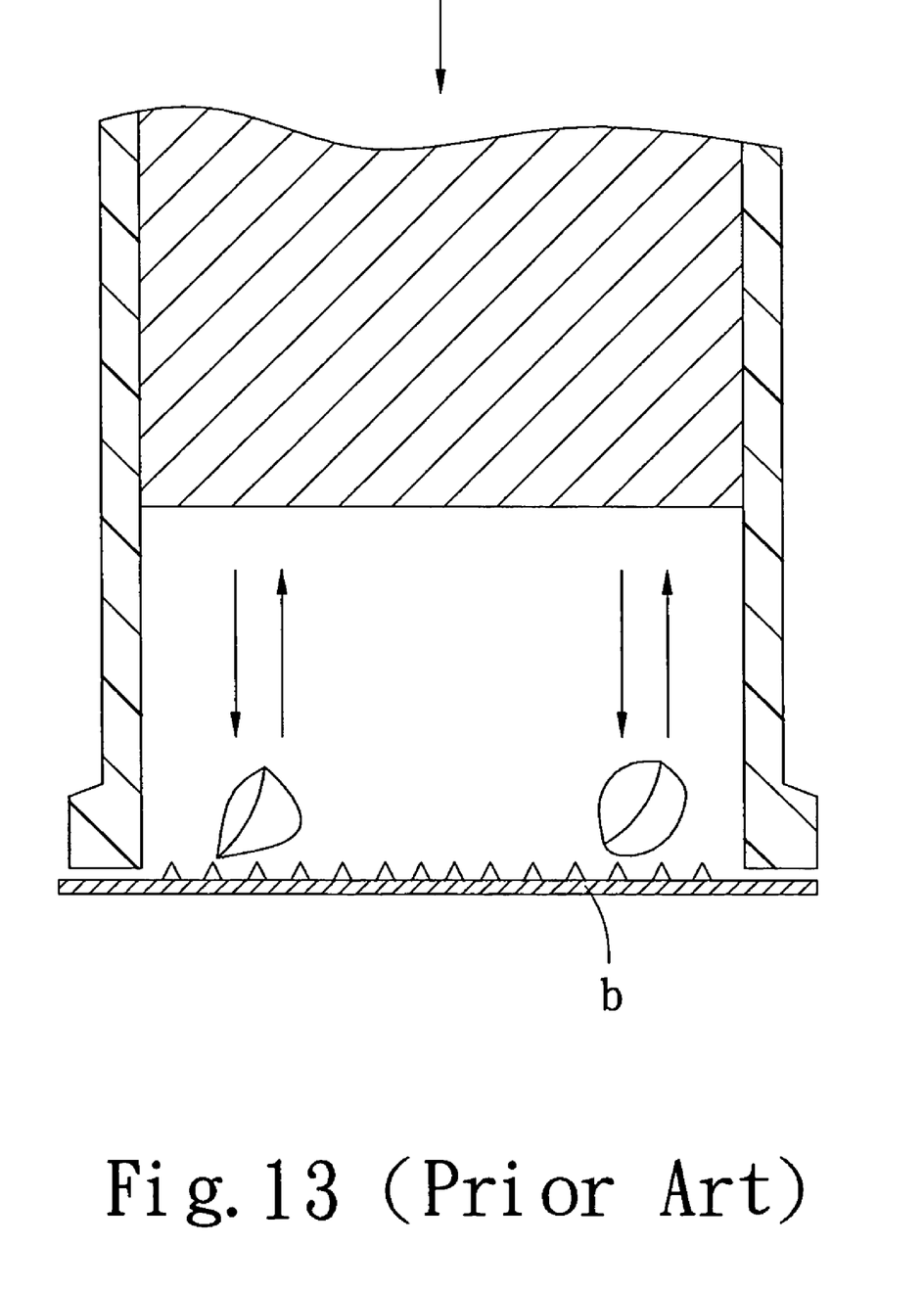
FIG. 13 shows the food and vegetable jump up and down in the second conventional food and vegetable processing device.
Figure 14:
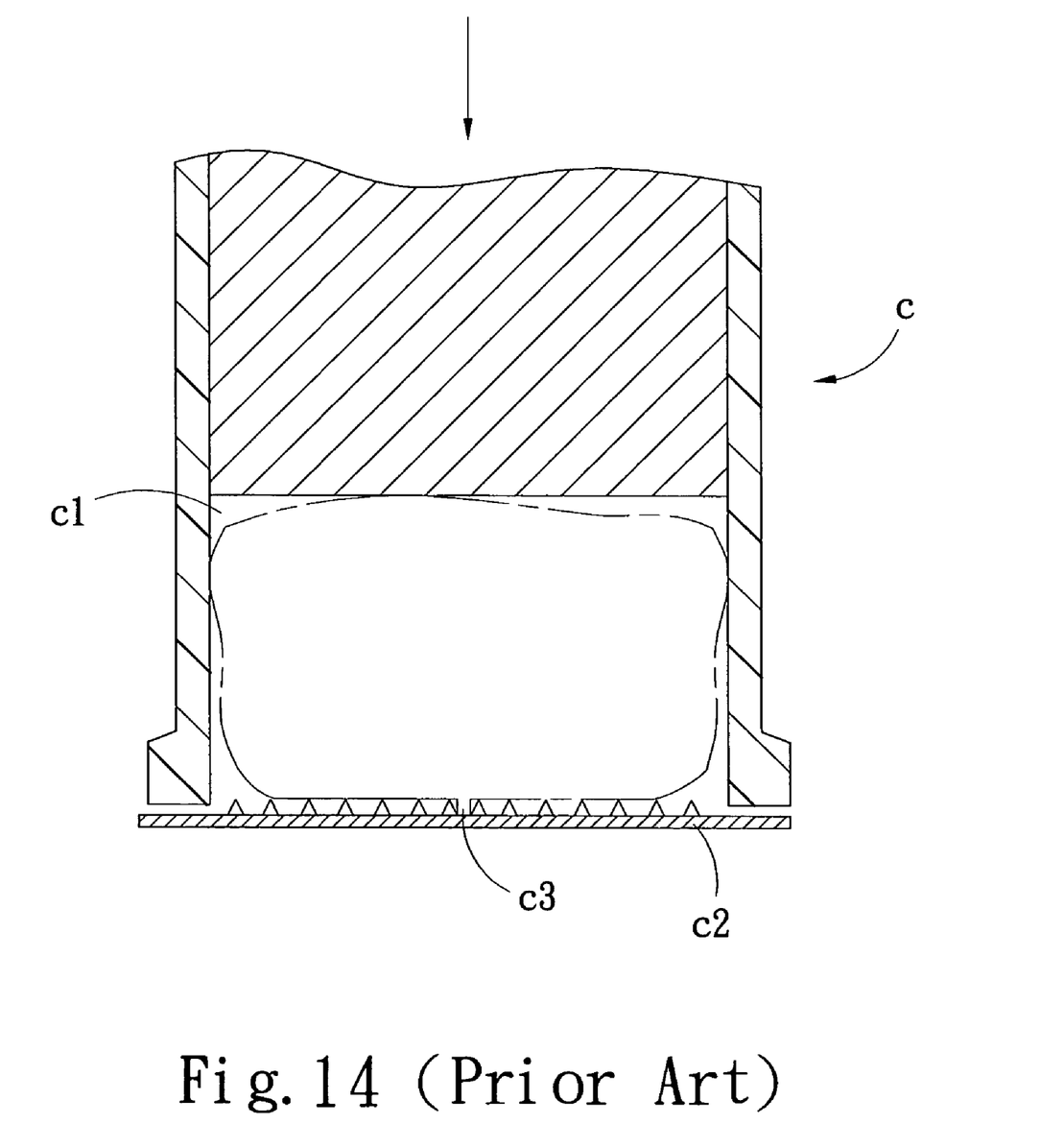
FIG. 14 shows a large piece of food and vegetable is to be processed in the third conventional food and vegetable processing device.

A conventional food and vegetable processing device "a" is disclosed in FIG. 12 and generally includes a top cap "a1" mounted onto the body of the device and a feeding passage "a2" defined through a member inserted in the top cap "a1". A motor is received in the body and drives a blade disk "a3" to process the food and vegetable that is fed through the feeding passage "a2". The user has to take a lot of time to cut the food and vegetable into small particles so as to be put into the feeding passage "a2" and it is noted that the feeding passage "a2" is located eccentrically to the blade disk "a3" which is effected by a force that is eccentric to the center of the blade disk "a3" and this increases the load of the motor. FIG. 13 shows another embodiment of conventional food and vegetable processing device which has an enlarged feeding passage which covers the center of the blade disk "b". Nevertheless, some food or vegetable particles could stock on the blade disk "b" and are not cut by the rotational blade disk "b". Yet other food or vegetable particles jump up and down between the blade disk "b" and the plug that pushes the food and vegetable toward the blade disk "b". This makes the device shaking during use. FIG. 14 shows yet another embodiment of the conventional device wherein if the food or vegetable is bulky and fills the space "c1" between the blade disk "c2" and the plug "c". Because the center of the blade disk "c2" is a plain surface without blade located thereon so that there will be a part "c3" of the food and vegetable engaged with the center of the blade disk "c2" and that is not processed. If the user continues to push the plug "c" downward, the motor could be damaged.

The present invention intends to provide a food and vegetable processing device that includes a convex blade disk so as to move the food and vegetable outward to be processed. Besides, the device includes a grinding feature for providing finely processed food and vegetable.

SUMMARY OF THE INVENTION

The present invention relates to a food and vegetable processing device which comprises a body with a motor which is connected to a processing unit. A lower cap is connected to the top of the body and encloses the processing unit. The processing unit has a blade disk which has a convex top surface with a plurality of cutting teeth located thereon. A top cap is mounted to the lower cap and has a feeding passage defined therethrough. A plug is movably inserted in the feeding passage.

The present invention will become more obvious from the following description when taken in connection with the accompanying drawings shown, for purposes of illustration only, a preferred embodiment in accordance with the present invention.

DETAILED DESCRIPTION OF THE PREFERRED EMBODIMENTS

Figure 1:
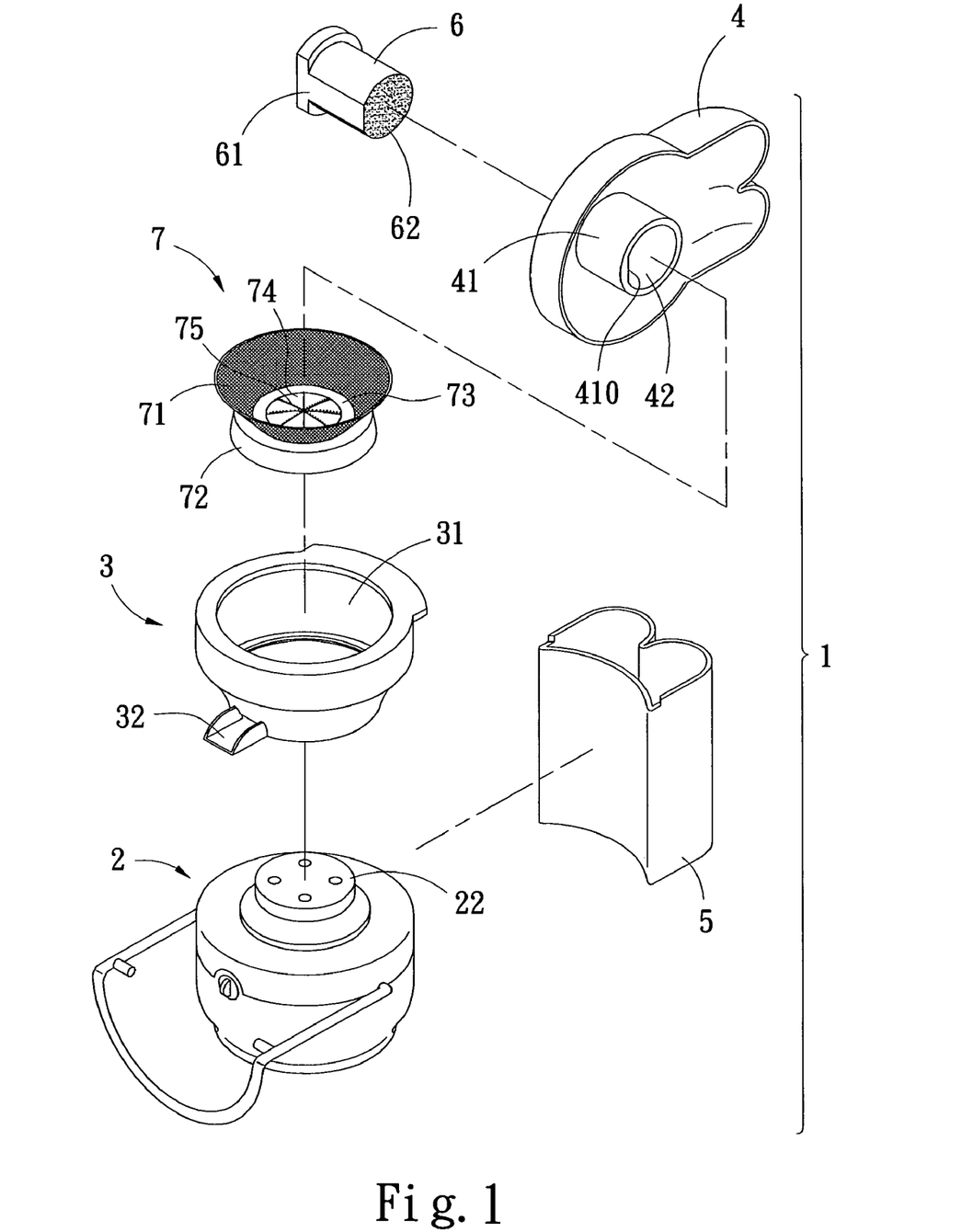
FIG. 1 is an exploded view to show the food and vegetable processing device of an embodiment of the present invention.
Figure 2:
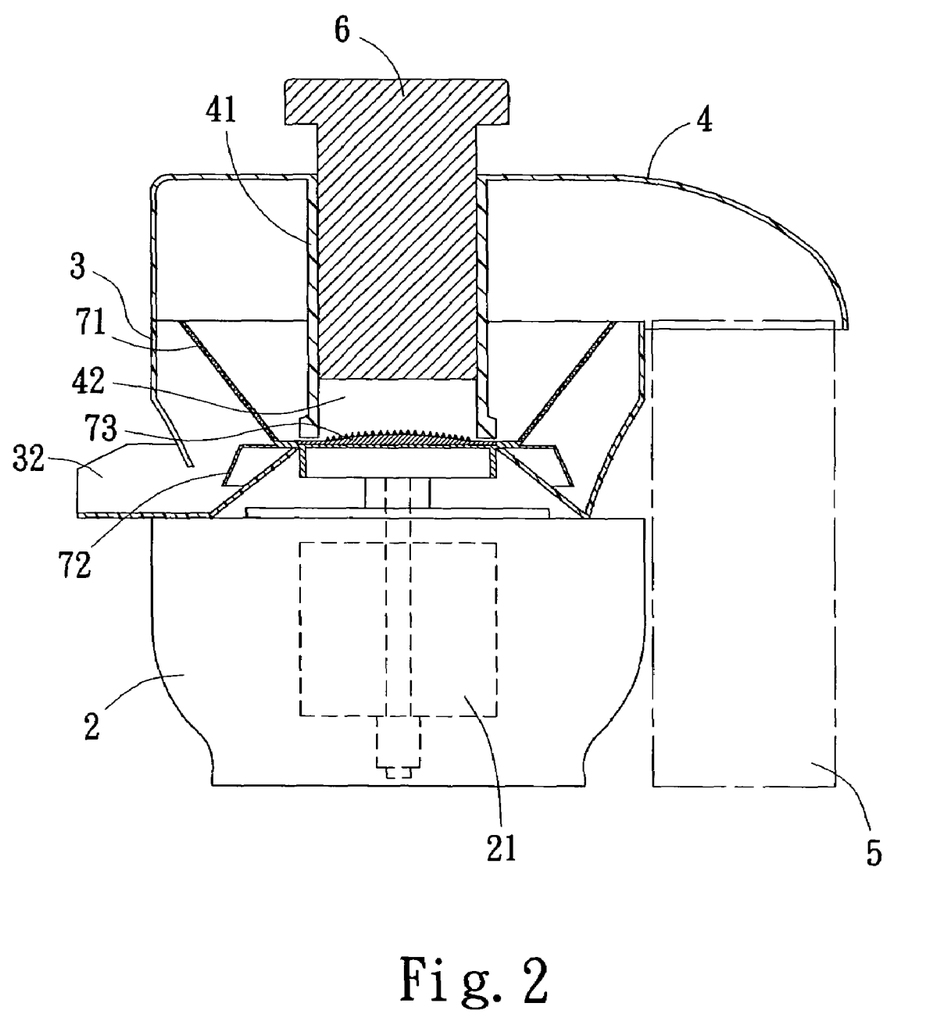
FIG. 2 is a cross sectional view to show the food and vegetable processing device of an embodiment of the present invention.
Figure 3:
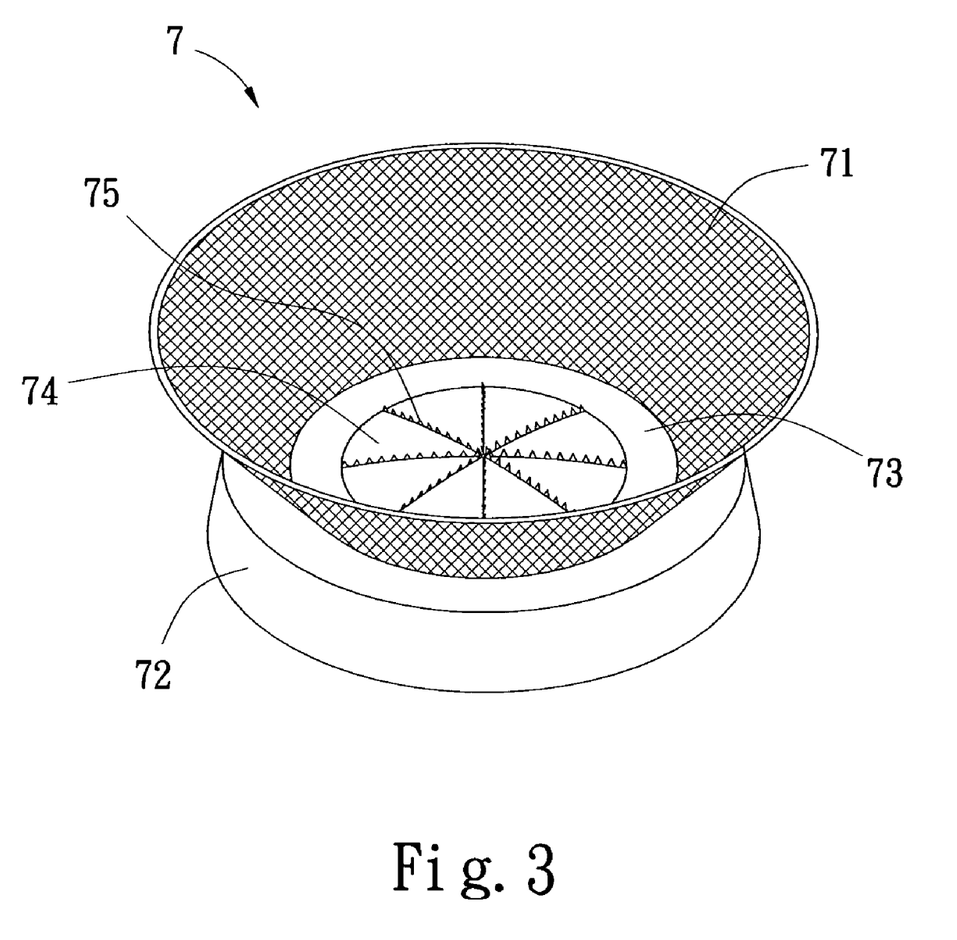
FIG. 3 is a perspective view to show the processing unit.

Referring to FIGS. 1 to 3, the food and vegetable processing device 1 of the present invention comprises a body 2 with a motor 21 received therein and an output shaft of the motor 21 extends through atop of the body 2 and is connected to a connection board 22. A lower cap 3 is connected to the top of the body 2 and has a space 31 defined therein so as to receive a processing unit 7 therein. An outlet 32 is defined in a side of the lower cap 3 and communicates with the space 31 so that juice comes out from the outlet 32.

Figure 4:
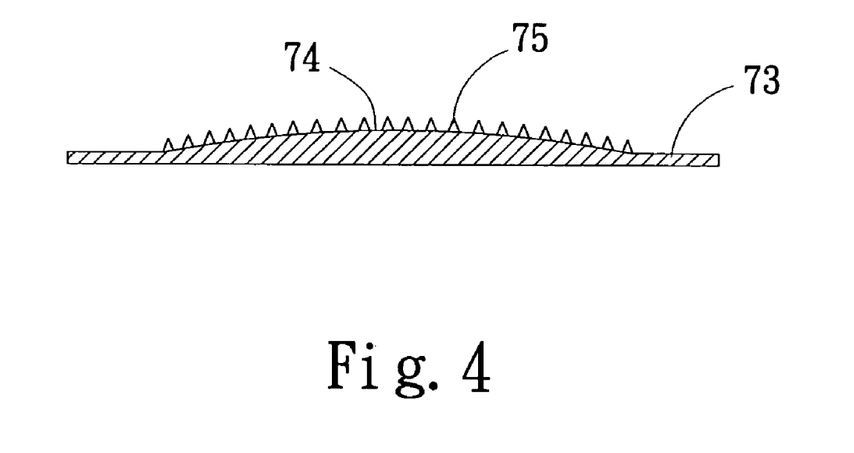
FIG. 4 is a cross sectional view of an embodiment of the blade disk of the present invention.
Figure 5:
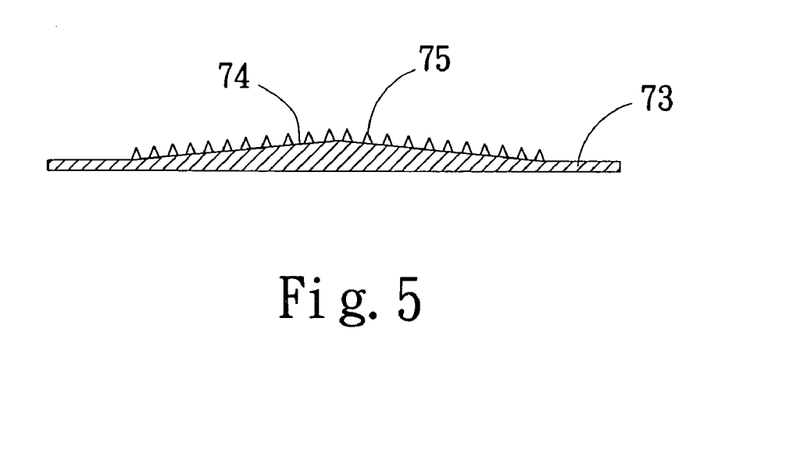
FIG. 5 is a cross sectional view of another embodiment of the blade disk of the present invention.

The processing unit 7 is connected to the connection board 22 and includes a blade disk 73 which has a convex top surface 74 and a plurality of cutting teeth 75 are located on the convex top surface 74 of the blade disk 73. A filtering portion 71 extends upward from the periphery of the processing unit 7 and a skirt portion 72 extends downward from the periphery of the processing unit 7. The filtering portion 71 allows the juice to pass therethrough and filters large particles. The skirt portion 72 prevents juice from leaking into the space where the motor 21 is received. As shown in FIGS. 4 and 5, the convex top surface 74 of the blade disk 73 can be a curve surface which has a higher center and a gradually inclined downward ramp, or the convex top surface of the blade disk 73 can be a cone-shaped surface.

Further shown in FIG. 1, a top cap 4 is mounted to the lower cap 3 and has a tube 41 extending from an underside thereof and a feeding passage 42 defined through the tube

41. A plug 6 is movably inserted in the feeding passage 42. A first surface 410 is defined in an inner periphery of the tube 41 and the plug 6 has a second surface 61 which is matched with the first surface 410. A rough end surface 62 is defined in an end of the plug 6 so as to position the food and vegetable to be processed. The rough surface 62 may include multiple spikes extending therefrom. A debris container 5 having an open top is located beside the body 2 and the open top is in communication with the top cap 4 so as to collect the debris of the food and vegetable.

Figure 6:
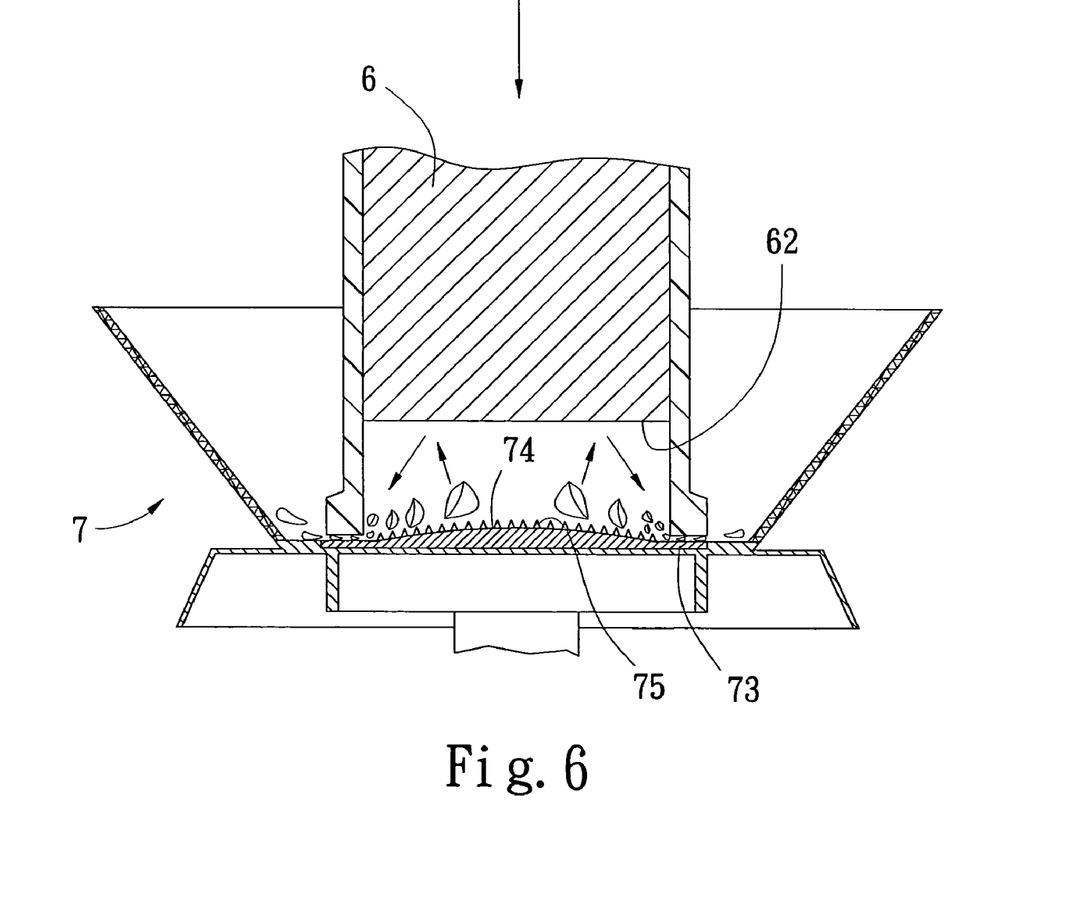
FIG. 6 shows the food and vegetable move outward on the blade disk of the present invention.
Figure 7:
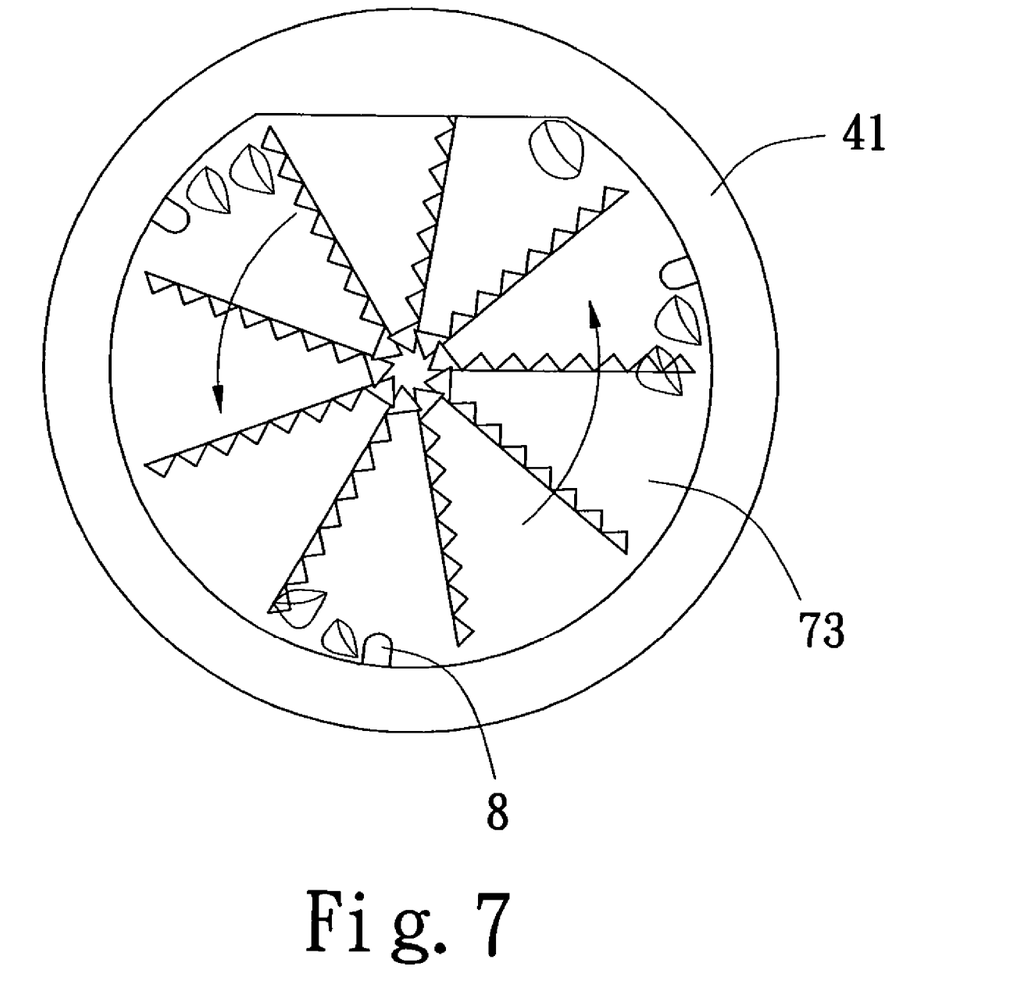
FIG. 7 is a top view to show protrusions on an inner periphery of the processing unit.

As shown in FIG. 6, because of the slope of the top surface 74 of the blade disk 73, the food and vegetable particles are cut and moved outward from the center, this ensures no particles are attached on the blade disk 73 and co-rotated with the blade disk 73. Furthermore, as shown in FIG. 7, a plurality of protrusions 8 extending inward from an inner periphery of the processing unit 7 and the protrusions 8 are located above the blade disk 73, so that the particles are stirred and hit other particles to increase the times that the particles are cut by the cutting teeth 75.

Figure 8:
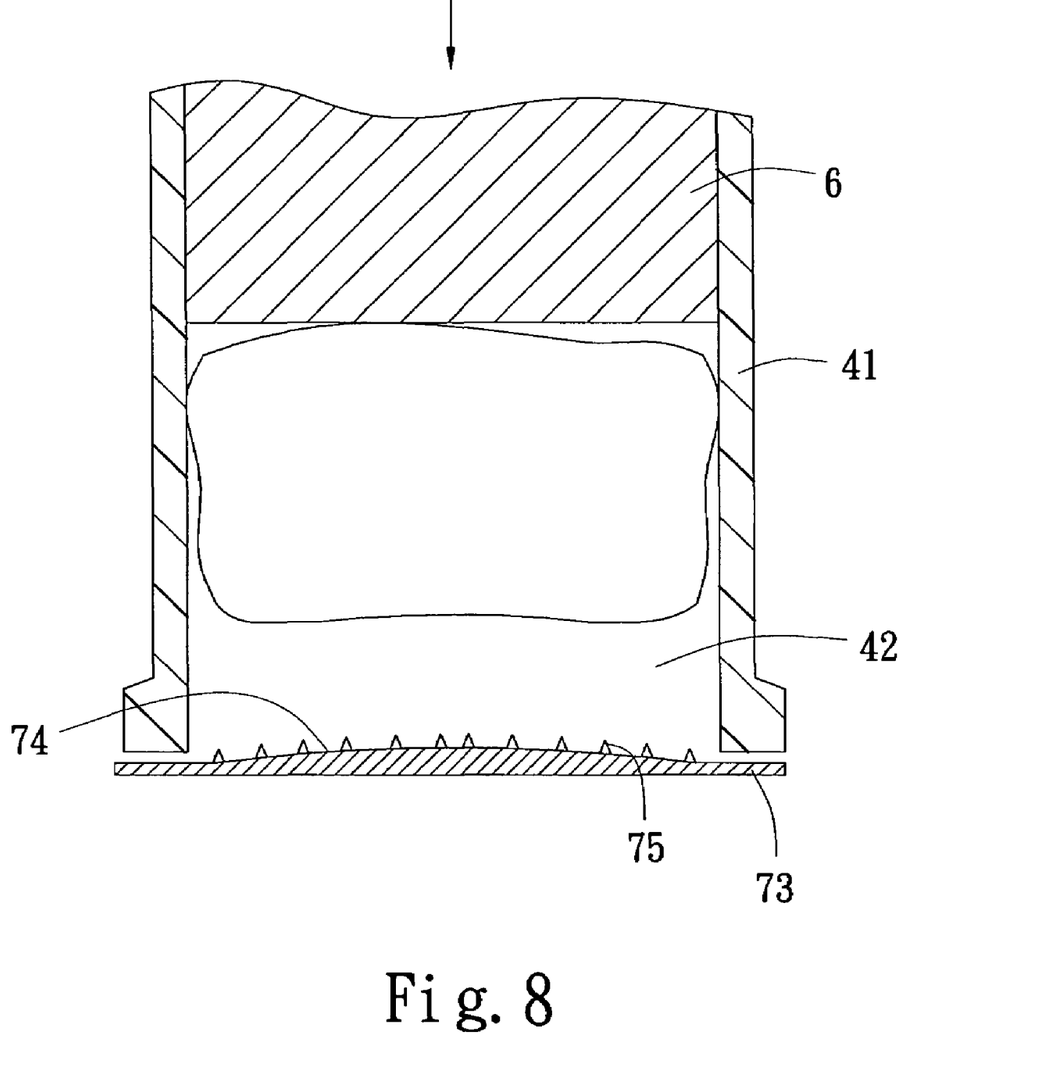
FIG. 8 shows a large piece of food and vegetable is fed in the feeding passage of the present invention.
Figure 9:
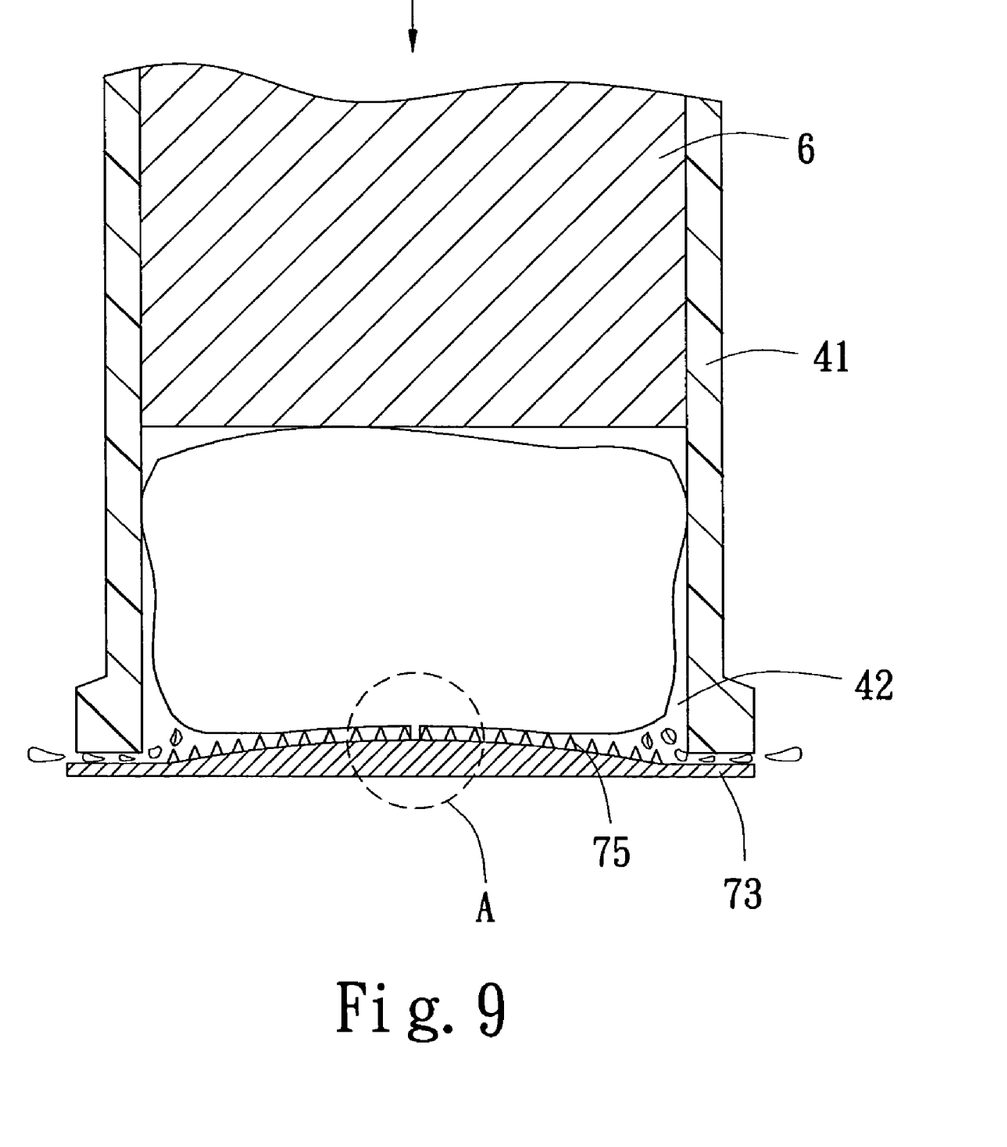
FIG. 9 shows the large piece of food and vegetable is in contact with the blade disk and cut to move outward.
Figure 9A:
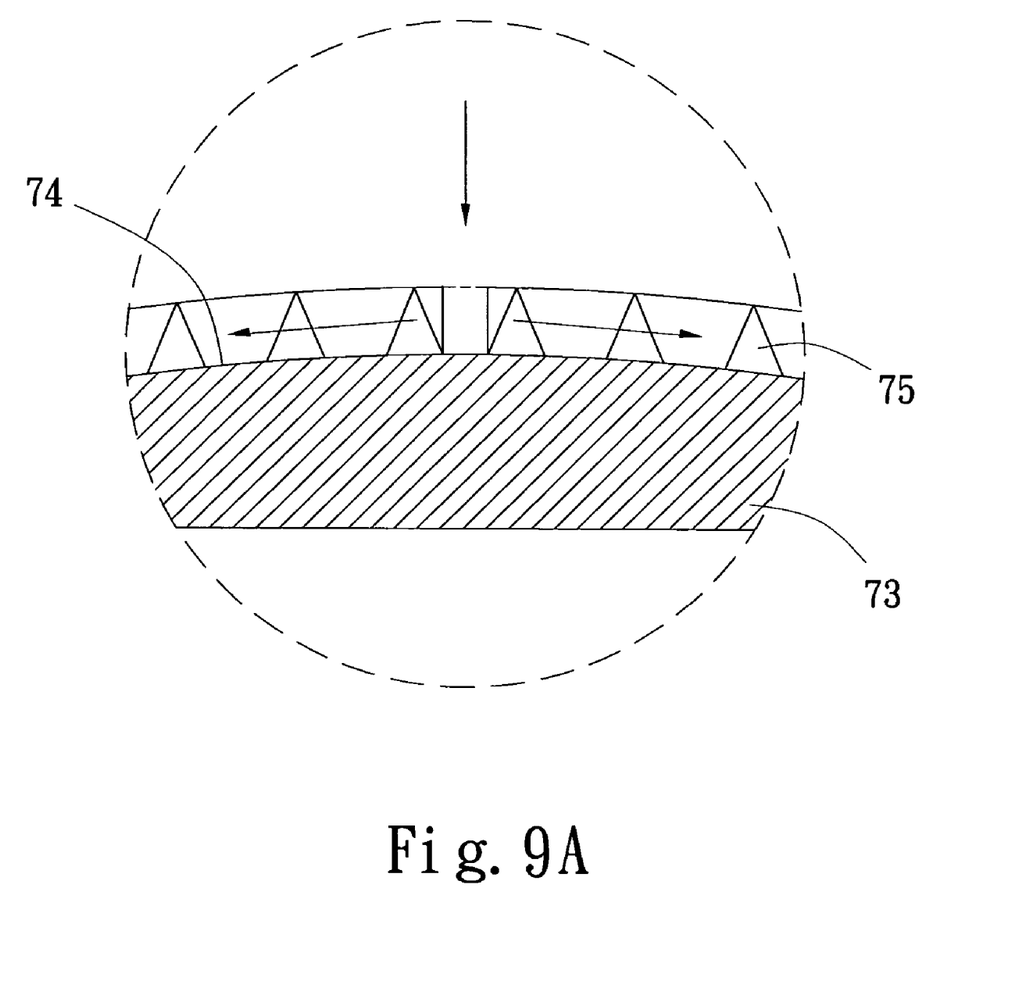
FIG. 9A shows an enlarged cross sectional view to show that the large piece of food and vegetable is in contact with the blade disk and cut to move outward.

As shown in FIGS. 8, 9 and 9A, if a large piece of food and vegetable is fed in the feeding passage 42 by the plug 6, the large piece is pushed to contact the blade disk 73 so that the particle is cut from a center thereof and small parts that are cut from the large particle move outward. The way of cut of the large piece particle changes its orientation with the rotation of the blade disk 73 till the whole piece of the large particle is cut.

Figure 10:
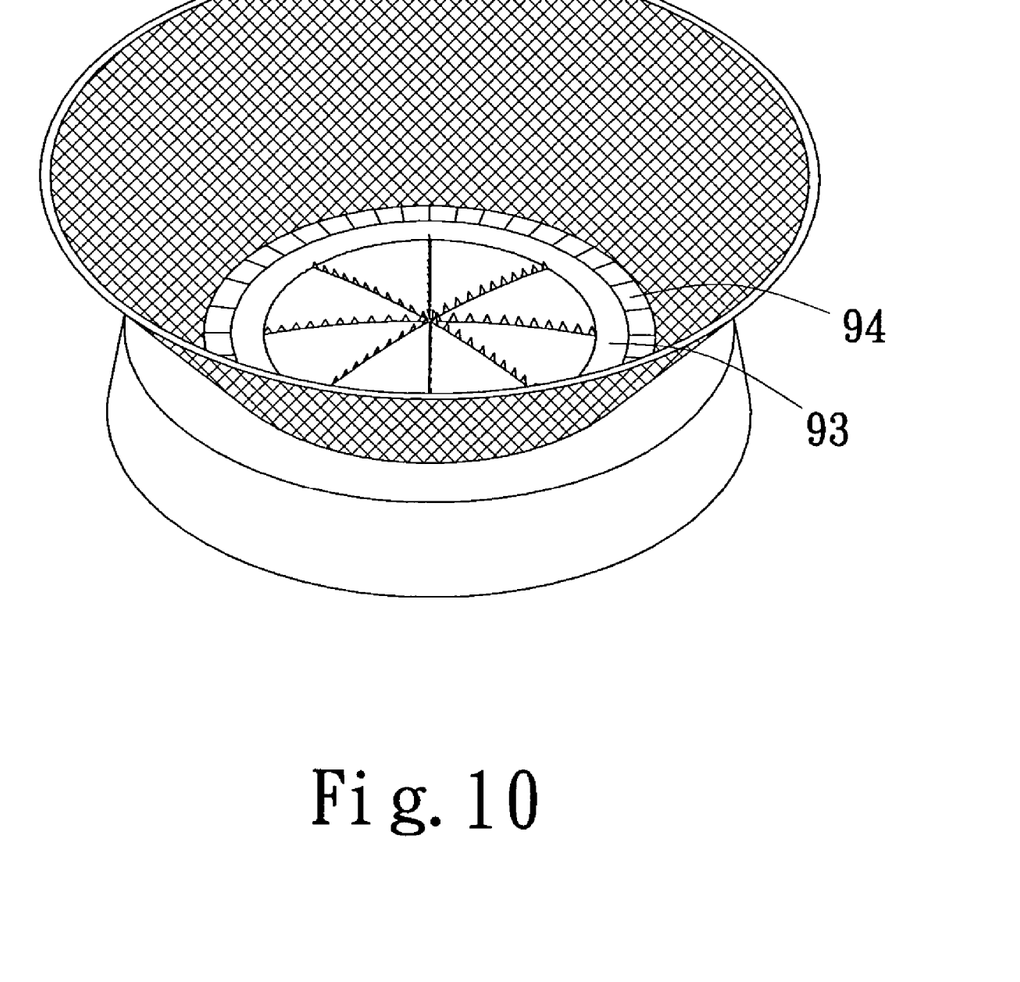
FIG. 10 shows that the processing unit includes an annular grinding surface.
Figure 11:
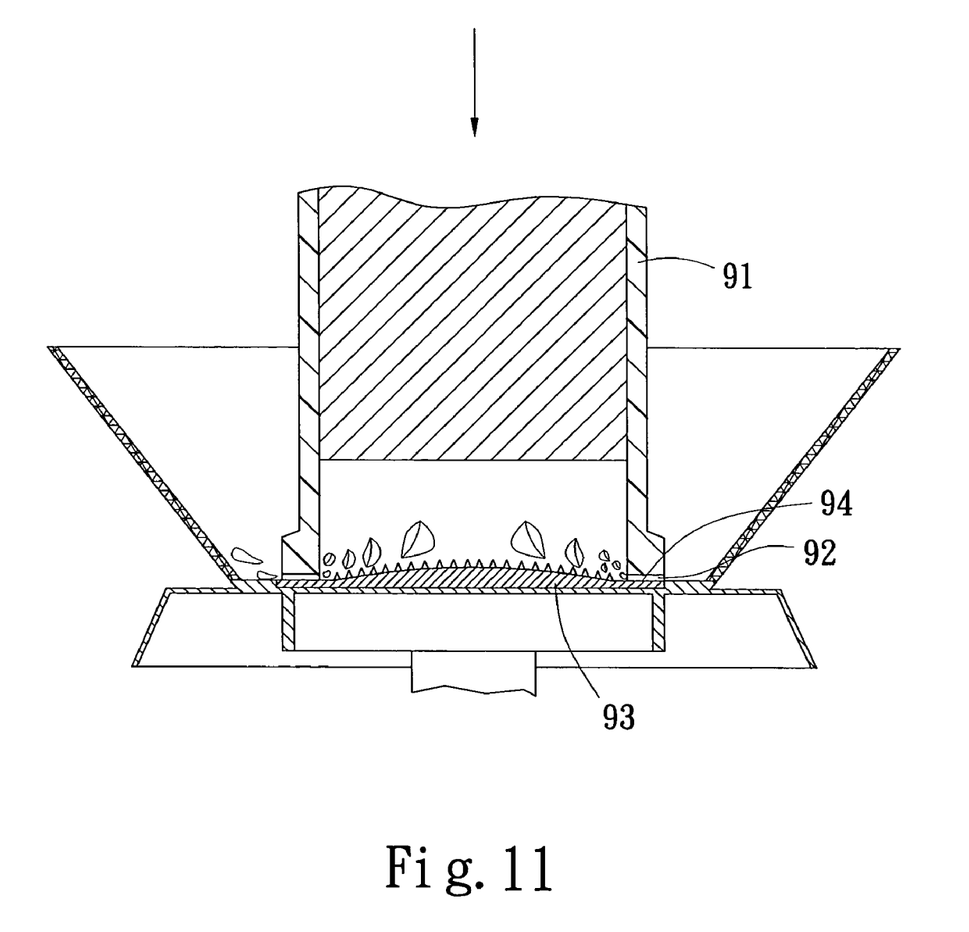
FIG. 11 is a cross sectional view to show the tube on the top cap has a first grinding surface located corresponding to the second grinding surface on the processing unit.

Referring to FIGS. 10 and 11, a first grinding surface 92 is defined in an end surface of the tube 42 and the blade disk 93 has an annular second grinding surface 94 which is located corresponding to the first grinding surface 92. A gap is defined between the two grinding surfaces 92 and 94 so that the particles to be processed can be ground between the two grinding surfaces 92 and 94.

While we have shown and described the embodiments in accordance with the present invention, it should be clear to those skilled in the art that further embodiments may be made without departing from the scope of the present invention.

What is claimed is:

1. A food and vegetable processing device comprising:

a body with a motor received therein and a connection board connected to an output shaft of the motor and located on a top of the body;

a lower cap connected to the top of the body and having a space defined therein, an outlet defined in a side of the lower cap and communicating with the space, a processing unit received in the space and connected to the connection board, the processing unit having a blade disk which has a convex top surface and a plurality of cutting teeth located on the convex top surface of the blade disk, and the blade disk having an outer periphery and a downward extending short skirt bending around the periphery for preventing juice from leaking into the body and motor, and a top cap mounted to the lower cap and having a feeding passage defined therethrough, a plug movably inserted in the feeding passage and wherein the top cap includes a tube extending from an underside thereof and the feeding passage defined through the tube, a first grinding surface defined in an end surface of the tube and the blade disk having an annular second grinding surface which is located corresponding to the first grinding surface.

2. The device as claimed in claim 1, wherein the convex top surface of the blade disk is a curve surface.

3. The device as claimed in claim 1, wherein the convex top surface of the blade disk is a cone-shaped surface.

4. The device as claimed in claim 1, wherein the top cap includes a tube extending from an underside thereof and the feeding passage is defined through the tube, a first surface is defined in an inner periphery of the tube, the plug having a second surface which is matched with the first surface defined in the inner periphery of the tube.

5. The device as claimed in claim 1, wherein the processing unit includes a filtering portion extending upward therefrom and a skirt portion extends downward from the processing unit.

6. The device as claimed in claim 1 further comprising a rough end surface defined in an end of the plug.

7. The device as claimed in claim 1 further comprising a plurality of protrusions extending inward from an inner periphery of the processing unit and the protrusions located above the blade disk.

8. The device as claimed in claim 1 wherein the end of the plug is provided with a plurality of cutting teeth.

9. The device as claimed in claim 1 further comprising a debris container having an open top which is in communication with the top cap.

* * * * *